United States Patent [19]

Goldman et al.

[11] 4,200,567
[45] Apr. 29, 1980

[54] SYNERGISTIC IMPACT MODIFIER SYSTEM FOR POLY (ALKYLENE TEREPHTHALATES)

[75] Inventors: Theodore D. Goldman, Cornwells Heights, Pa.; Sutton B. Farham, Richmond, Va.

[73] Assignee: Rohm and Haas Company, Philadelphia, Pa.

[21] Appl. No.: 826,289

[22] Filed: Aug. 22, 1977

[51] Int. Cl.$^2$ .................... B01F 7/00; C08L 67/06
[52] U.S. Cl. ................... 260/40 R; 525/183; 525/63
[58] Field of Search .............. 260/873, 876 R, 40 R

[56] References Cited

U.S. PATENT DOCUMENTS

| | | | |
|---|---|---|---|
| 3,864,428 | 2/1978 | Nakamura et al. | 260/873 |
| 3,954,689 | 5/1976 | Hoeschle | 260/22 D |
| 4,096,202 | 6/1978 | Farnham et al. | 260/873 |

FOREIGN PATENT DOCUMENTS 50-48059  4/1975  Japan.

Primary Examiner—Richard B. Turer
Attorney, Agent, or Firm—Michael B. Fein

[57] ABSTRACT

Poly($C_2$ to $C_8$ alkylene terephthalates) are improved by a novel synergistic impact modifier system comprised of one or more soft thermoplastic segmented copolyester elastomers and one or more multiphase composite interpolymers.

18 Claims, No Drawings

SYNERGISTIC IMPACT MODIFIER SYSTEM FOR POLY (ALKYLENE TEREPHTHALATES)

BACKGROUND OF THE INVENTION

1. Field of the Invention

This invention relates to impact modification of poly($C_2$ to $C_8$ alkylene terephthalates).

2. Description of the Prior Art

Poly($C_2$ to $C_8$ alkylene terephthalates) are limited in their use as molding resins due to their relatively low notched impact strength at room temperature and below.

The poly(alkylene terephthalates) with the most potential utility as molding resins are the low molecular weight materials, corresponding to a low intrinsic viscosity (IV), because of reduced cost and improved flow properties which are most useful for injection molding. However, decreasing the IV of a poly(alkylene terephthalate) results in loss of notched impact strength as well as a decreased response to previously-suggested impact modifier systems. The use of additives such as mineral fillers and flame retardants tends to further embrittle these plastics.

Various modifier systems for improving the toughness of these thermoplastics have been suggested. Japanese Patent Publication No. 75-48059 of Apr. 28, 1975; German Patent DT No. 2338615 corresponding to U.S. Patent Applications Ser. No. 276,502 of July 31, 1972 now abandoned and Ser. No. 358,778 of May 9, 1973; and Japanese Pat. No. 75-160,365 teach the use of segmented copolyester elastomers as impact modifiers for poly(alkylene terephthalates), the latter further teaching glass fiber reinforcement. An excellent impact modification system comprised of a multiphase composite interpolymer having a first phase polymerized from a monomer system comprised of about 75 to 99.8% $C_1$ to $C_6$ alkyl acrylate has been suggested by Farnham and Goldman in U.S. Patent Application Ser. No. 694,509 of June 9, 1976 now U.S. Pat. No. 4,096,202. U.S. Pat. No. 3,919,353 suggested impact modifiers based on rubbers of polybutadiene, butadiene-styrene copolymers, butadiene-acrylonitrile copolymers, ethylenepropylene rubbers, polyisobutene and polyisoprene; and U.S. Pat. No. 3,864,428 teaches the mixture of aromatic polycarbonates and graft copolymers of a butadiene polymer-vinyl monomer as a synergistic impact modification system for poly(alkylene terephthalates).

While some of the prior systems are efficient, the industry still seeks more efficient impact modification systems for poly(alkylene terephthalates).

It is an object of the present invention to provide a more efficient impact modification system for poly(alkylene terephthalates).

It is a further object to provide an improved injection moldable poly(alkylene terephthalate).

A still further object of the present invention is a method for improving the impact strength of poly(alkylene terephthalates).

SUMMARY OF THE INVENTION

These objects, and still others which will become apparent from the following disclosure, are achieved by the present invention which comprises a synergistic impact modifier system comprising
A. one or more thermoplastic segmented copolyester elastomers, and
B. one or more multiphase composite interpolymers comprising about 25 to 95 weight percent of a first elastomeric phase polymerized from a monomer system selected from the group consisting of
   i. a monomer system comprising about 75 to 99.8% by weight $C_1$ to $C_8$ alkyl acrylate, 0.1 to 5% by weight crosslinking monomer, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a poly-ethylenically unsaturated monomer having a plurality of addition polymerizable reactive groups at least one of which polymerizes at a substantially different rate of polymerization from at least one other of said reactive groups; and
   ii. a monomer system comprising at least 50 percent by weight butadiene and 0 to 50 percent by weight of a different ethylenically unsaturated monomer; and about 5 to 75 weight percent of a final rigid thermoplastic phase polymerized in the presence of the first elastomeric phase, the ratio of B to A being about 1:2 to 4:1.

Another aspect of the invention is injection moldable compositions comprising poly(alkylene terephthalate) and about 1 to 40% by weight of the synergistic impact modifier system described above. Another aspect of the invention is the process for improving poly(alkylene terephthalates) comprising blending therewith the synergistic impact modifier system.

DETAILED DESCRIPTION OF THE INVENTION AND DESCRIPTION OF THE PREFERRED EMBODIMENT

The poly(alkylene terephthalates) suitable for modification are well known rigid thermoplastic polymers. Examples of suitable poly($C_2$ to $C_8$ alkylene terephthalates) include poly(ethylene terephthalate), poly(1,3-propylene terephthalate), poly(1,4-butylene terephthalate), poly(1-6-hexylene terephthalate), poly(1,4-cyclohexylene terephthalate), poly(1,4-cyclohexylene dimethylene terephthalate), and the like. Poly(1,4-butylene terephthalate) is preferred for impact modification as taught in this invention. While polyesters with a broad range of viscosities can be used in this invention, low IV materials are most appropriate since they are generally less responsive to typical impact modifiers. In the case of poly(1,4-butylene terephthalate), the estimated intrinsic viscosity range is 0.5–1.4 dl/g.

The synergistic impact modifier system is comprised of about 1 to 4 parts of one or more multiphase composite interpolymers as described herein and about 1 to 2 parts of one or more soft thermoplastic segmented copolyester elastomers.

The copolyester elastomers are derived from the condensation polymerization of one or more dicarboxylic acids or polymerizable derivatives, one or more long chain glycols, and one or more short chain glycols. The dicarboxylic acids or ester derivatives are primarily aromatic in character, such as terephthalic and isophthalic, although aliphatic acids or ester derivatives such as succinic, glutaric, and azelaic may be incorporated at modest levels. The long chain glycols have a molecular weight of about 400–6000 and are generally poly(alkylene ether) glycols such as poly(ethylene ether) glycol, poly(propylene ether) glycol and preferably poly(tetramethylene ether) glycol. The short chain glycols can be ethylene, propylene, butylene, and the like.

Considerable literature exists describing polyester elastomers that are suitable for use in this invention as well as the standard polymerization techniques used for their preparation, for example, German Pat. No. DT2338-615, Japanese Pat. Nos. 75,160,365 and 75,48,059, and U.S. Pat. Nos. 3,651,014, 3,023,192, 3,763,109, 3,766,146, and 3,954,689. The use of branched polyester elastomers are also useful. The use of polyester elastomers where the long chain ester segments are derived from long chain dicarboxylic acids, rather than poly(alkylene ether) glycol esters, are of interest when resistance to thermal degradation and weathering stability are of importance. Such materials are described in U.S. Pat. No. 3,954,689.

Preferred polyester eleastomers are derived from terephthalic acid and derivatives, isophthalic acid and derivatives, 1,4-butanediol, and poly(tetramethylene ether) glycol such that the long chain ester segments comprise 10–90 percent by weight of the total polyester elastomer. The greatest potential of these elastomers is realized when their estimated intrinsic viscosity (60% phenol/40% tetrachloroethane) is $\geq 1.0$.

The multiphase composite interpolymers have either a crosslinked rubbery acrylic or butadiene type first stage graftlinked to an outer rigid thermoplastic phase.

The multi-stage core/shell polymer is comprised of a crosslinked acrylic or butadiene based first stage polymer which is graft linked to an outer rigid thermoplastic stage. Preferably the core/shell polymer comprises about 25 to 95 weight percent of a first stage rubber and about 5 to 75 weight percent of a final rigid thermoplastic stage. One or more intermediate stages are optional, for example a middle stage polymerized from 75 to 100 weight percent styrene. The first stage can be polymerized from about 75 to 99.8 weight percent $C_1$ to $C_8$ alkyl acrylate resulting in an acrylic rubber core having a Tg below 10° C. and crosslinked with 0.1 to 5 weight percent crosslinking monomer and further containing 0.1 to 5 weight percent graftlinking monomer. The crosslinking monomer is a polyethylenically unsaturated monomer, such as butylene diacrylate and dimethacrylate and divinyl benzene and the like, having a plurality of double bonds all of which polymerize at substantially the same rate. The graftlinking monomer is a polyethylenically unsaturated monomer having a plurality of double bonds, at least one of which polymerizes at a substantially different rate of polymerization from at least one other of said groups. Examples of graftlinking monomers are allyl methacrylate, diallyl maleate and the like. These core/shell polymers are prepared using conventional emulsion polymerization techniques.

The first stage of the multiphase or multistage polymer can alternatively be polymerized from a butadiene monomer system, i.e., one comprised of at least 50 percent by weight butadiene and the balance one or more different ethylenically unsaturated monomers such as styrene, isoprene, acrylonitrile, etc. The butadiene types are usually superior to acrylics for impact enhancement, but inferior for thermal stability. Combinations of acrylic and butadiene-based multiphase polymers are contemplated to obtain a balance of properties for certain applications.

Fillers appropriate to this invention include particulate minerals such as Wollastonite (calcium meta silicate) and mica. In addition, glass or other fibrous reinforcement and flame retardant additives are acceptable. Combinations of such additives are also useful when fillers and fibrous reinforcement are used. Suitable ranges are about 10 to 50 weight percent based on total weight of the blend.

A suitable method of blending the synergistic impact modifier system, poly(alkylene terephthalate), filler, reinforcement, flame retardant, colorant, and any other ingredients is by extrusion blending, for example. Preferably the components are dried before extrusion blending. The extrudate can be pelletized and dried before molding. The composition can be injection molded using typical reciprocating screw injection molding equipment.

EXAMPLES

The following examples are presented to illustrate a few embodiments of the invention. All parts and percentages are by weight unless otherwise indicated.

In the following Examples, the abbreviations in accordance with the following Table are used:

| | | |
|---|---|---|
| BA | = | n-butyl acrylate |
| EA | = | ethyl acrylate |
| EHA | = | 2-ethylhexyl acrylate |
| BDA | = | 1,3-butylene diacrylate |
| BGDMA | = | 1,3-butylene dimethacrylate |
| AlMA | = | allyl methacrylate |
| St | = | styrene |
| MMA | = | Methyl methacrylate |
| LMA | = | lauryl methacrylate |
| AN | = | acrylonitrile |
| DALM | = | diallyl maleate |
| PBT | = | poly(butylene terephthalate) |
| BD | = | butadiene |
| AA | = | acrylic acid |
| DMAEMA | = | dimethylaminoethyl methacrylate |
| AAM | = | acrylamide |
| HEMA | = | 2-hydroxyethyl methacrylate |
| PET | = | poly(ethylene terephthalate) |
| DVB | = | divinyl benzene |

A single slash is used between monomers of a single stage and a double slash is used as a shorthand method of indicating a separation between stages or phases. The first stage to be polymerized is written first before the double slash, and subsequent stages are written subsequently.

EXAMPLES 1 to 31

Using conventional emulsion polymerization, multiple stage composite interpolymers of the following formulations are prepared:

| EXAMPLE NO. | COMPOSITION | MONOMER WEIGHT RATIOS |
|---|---|---|
| 1 | BA/BDA/AlMA/MMA/AlMA | 69.45/.35/.28//19.95/9.97 |
| 2 | BA/BDA/DALM//MMA/AlMA | 69.45/.35/.28//19.95/9.97 |
| 3 | BA/BDA/AlMA//MMA/AlMA | 79.3/.4/.32//9.99/9.99 |
| 4 | BA/BDA/AlMA | 89.19/.45/.36//10.00 |
| 5 | BA/BDA/AlMA//MMA/AlMA | 69.45/.35/.28//9.97/19.95 |
| 6 | BA/BDA/AlMA//MMA/DALM | 69.45/.35/.28//19.95/9.97 |

-continued

| EXAMPLE NO. | COMPOSITION | MONOMER WEIGHT RATIOS |
| --- | --- | --- |
| 7 | BA/BDA/AlMA//MMA/AlMA/EA | 69.45/.35/.28//17.95/9.97/2.00 |
| 8 | BA/BDA/AlMA//MMA/AlMA | 69.45/.35/.28//19.95/9.97 |
| 9 | BA/BDA/AlMA//St//MMA/EA | 59.46/.30/.24//18//19.8/2.2 |
| 10 | BA/BDA/AlMA//St/MMA/EA | 59.48/.3/.24//17.99/19.79/2.2 |
| 11 | BA/BDA/AlMA//MMA/EA | 59.48/.3/.24//35.98/4 |
| 12 | BA/BDA/AlMA//MMA/EA | 72.61/.37/.29//24.03/2.7 |
| 13 | BD/St//St//MMA/EA | 47/13//18//19.8/2.2 |
| 14 | BA/BDA/DALM//MMA | 69.3/.35/.35//30 |
| 15 | BA/BDA/AlMA//St//MMA/EA | 59.47/.3/.24//18.00//19.80/2.19 |
| 16 | BA/BDA/AlMA//St//MMA/EA | 59.46/.3/.24//18//19.8/2.2 |
| 17 | EHA/BDA/AlMA//St//MMA/EA | 59.59/.3/.24//18.00//19.81/2.15 |
| 18 | BA/BDA/AlMA//MMA/LMA | 69.37/.35/.28//20/10 |
| 19 | BA/BDA/AlMA//AN/MMA | 69.37/.35/.28//7.5/22.5 |
| 20 | BA/BDA/AlMA//AN/St | 69.37/.35/.28//7.5/22.5 |
| 21 | BA/BDA/AlMA//AlMA//MMA/EA | 69.45/.35/.28//9.97//17.95/2.00 |
| 22 | BD/St//MMA/DVB//St//MMA/BGDMA | 70.6/3//3/.78//11.02//11.48/.12 |
| 23 | BA/BDA/AlMA//MMA/AA | 69.37/.35/.28//25/5 |
| 24 | BA/BDA/AlMA//MMA/HEMA | 69.37/.35/.28//20/10 |
| 25 | BA/BDA/AlMA//MMA/DMAEMA | 69.37/.35/.28//26.5/3.5 |
| 26 | BA/BDA/AlMA//MMA/AAM | 69.37/.35/.28//26.5/3.5 |
| 27 | BA/BDA/DALM//MMA | 79.2/.4/.4//20 |
| 28 | BA/BDA/AlMA//MMA/EA | 79.28/.4/.32//18/2 |
| 29 | BA/BDA/AlMA//MMA/EA | 81.26/.41/.33//16.2/1.8 |
| 30 | BA/BDA/AlMA//MMA/EA | 84.23/.43/.34//13.5/1.5 |
| 31 | BA/BDA/AlMA//MMA/EA | 87.21/.45/.34//10.8/1.2 |

EXAMPLES 32 to 34

These examples illustrate the segmented copolyester elastomers useful in the invention. Estimated intrinsic viscosities were determined in phenol/tetrachloroethane (60/40). The long chain segment refers to the poly(alkylene ether) glycol tere(iso)phthalate segments while the short chain segment refers to the alkylene tere(iso)phthalate segments. DMT/DMI refers to the ratio of dimethyl terephthalate to dimethyl isophthalate used in preparation of polyester elastomer.

| EXAMPLE NO. | Derivation | Wt. % Long Chain Segments | Wt. % Short Chain Segments | DMT/DMI | IV |
| --- | --- | --- | --- | --- | --- |
| 32 | duPont Hytel 4056 Polyester Elastomer E.I. duPont deNemours & Co. (Inc.) | | | — | 1.65 |
| 33 | Dimethyl terephthalate, dimethyl isophthalate, poly (tetramethylene ether) glycol MW 1000, butanediol | .70 | 30 | 2 | 2.00 |
| 34 | Same as Ex. 33 except poly (tetramethylene ether) Glycol MW 2000 is used | 72 | 28 | 2 | 1.39 |

EXAMPLES 35 to 39

In the following examples, five different poly(butylene terephthalates) of varying molecular weight were used. Estimated intrinsic viscosities were determined in phenol/tetrachloroethane (60/40).

| EXAMPLE | IV |
| --- | --- |
| 35 | 0.90 |
| 36 | 0.74 |
| 37 | 0.79 |
| 38 | 0.72 |
| 39 | 1.01 |

EXAMPLE 40

The blending of the thermoplastic polyester, impact modifiers, and filler is accomplished by typical processing techniques used in processing thermoplastic polyester resins. In the examples used to illustrate this invention the following procedure was employed: Extrusion blend of modifiers, resin, and filler were prepared using a 1″ diameter 24:1 L/D extruder with a two stage screw having compression ratios of 3.1/3.5. Extrusion temperatures were in the range of 450°–525° F. Prior to extrusion, the polyester resin was dried at 120° C. under vacuum (20 mm) for 4–6 hrs. Each mixture of the modifiers and filler was dried at ambient temperature under vacuum (20 mm) for 16 hrs. The components were combined and mixed just prior to each extrusion. The extrudates were pelletized, dried (120° C., 4 hrs., 20 mm), and molded using a 1.5 oz. reciprocating screw injection molding machine with an ASTM family mold. Processing temperatures again ranged from 450° to 525° F. with a mold temperature of ca. 150° F. and ca. 30–45 sec. cycle time. Notched Izod impact strengths were determined by ASTM D-256 using ⅛″ thick milled notched injection molded bars. Tensile properties were determined by ASTM D-638 using ⅛″ microtensile bars with 0.3 in./min. combined speed.

Using the PBT of Example 36, the core-shell polymer of Example 22, the segmented copolyester elastomer of Example 32, and the calcium metasilicate as filler, Izod impact strengths were measured. As can be seen from the following Table, the combination of core-shell polymer and segmented copolyester elastomers gives synergistic improvement to Izod impact strength.

TABLE

|   | PBT | Filler | Core-Shell Polymer | Polyester Elastomer | Izod |
|---|---|---|---|---|---|
| A | 70 | 30 | — | — | 0.37 ± .06 |
| B | 50 | 30 | 20 | — | 0.79 ± .17 |
| C | 50 | 30 | — | 20 | 0.79 ± .09 |
| D | Predicted value for any ratio of core-shell polymer/polyester elastomer at 20% level | | | | 0.79 |
| E | 50 | 30 | 10 | 10 | 0.97 ± .09 |
| F | 50 | 30 | 13.3 | 6.7 | 1.19 ± .14 |
| G | 50 | 30 | 15 | 5 | 1.05 ± .09 |

EXAMPLE 41

Example 40 is repeated, except using the PBT of Example 35 instead of Example 36.

|   | PBT | Filler | Core-Shell Polymer | Polyester Elastomer | Izod |
|---|---|---|---|---|---|
| A | 70 | 30 | — | — | 0.51 ± .08 |
| B | 50 | 30 | 20 | — | 0.97 ± .06 |
| C | 50 | 30 | — | 20 | 1.04 ± .10 |
| D | Predicted value for 1:1 ratio of core-shell polymer/polyester elastomer at 20% level | | | | 1.01 |
| E | 50 | 30 | 10 | 10 | 1.08 ± .13 |
| F | 50 | 30 | 13.3 | 6.7 | 1.21 ± .09 |

EXAMPLE 42

The procedure of Example 41 is followed, except using smaller levels of impact modifiers.

|   | PBT | Filler | Core-Shell Polymer | Polyester Elastomer | Izod |
|---|---|---|---|---|---|
| A | 70 | 30 | — | — | 0.51 ± .08 |
| B | 55 | 30 | 15 | — | 0.90 ± .06 |
| C | 55 | 30 | — | 15 | 0.81 ± .13 |
| D | Predicted value for 1:1 ratio of core-shell polymer/polyester elastomer at 15% level | | | | 0.86 |
| E | 55 | 30 | 7.5 | 7.5 | 0.81 ± .14 |
| F | 55 | 30 | 10 | 5 | 1.01 ± .06 |

EXAMPLE 43

The procedure of Example 40 is followed, except using the PBT of Example 37 and the core-shell polymer of Example 27.

|   | PBT | Filler | Core-Shell Polymer | Polyester Elastomer | Izod |
|---|---|---|---|---|---|
| A | 70 | 30 | — | — | 0.52 ± .12 |
| B | 56 | 24 | 20 | — | 0.70 ± .03 |
| C | 56 | 24 | — | 20 | 0.96 ± .06 |
| D | Predicted value at 1:1 ratio of core-shell polymer/polyester elastomer at 20% level | | | | 0.83 |
| E | 56 | 24 | 10 | 10 | 0.95 ± .08 |

EXAMPLE 44

The procedure of Example 40 is repeated, except using the PBT of Example 38, and further including the specified amount of glass fiber reinforcement.

|   | PBT | Filler | Glass Fiber | Core-Shell Polymer | Polyester Elastomer | Izod |
|---|---|---|---|---|---|---|
| A | 70 | 15 | 15 | — | — | 0.95 ± .03 |
| B | 50 | 15 | 15 | 20 | — | 2.03 ± .18 |
| C | 50 | 15 | 15 | — | 20 | 1.89 ± .08 |
| D | Predicted value for 1:1 ratio of core-shell polymer/polyester elastomer at 20% level | | | | | 1.96 |
| E | 50 | 15 | 15 | 10 | 10 | 2.14 ± .16 |
| F | 50 | 15 | 15 | 13.3 | 6.7 | 2.67 ± .12 |

EXAMPLE 45

The procedure of Example 44 is repeated, except using the core-shell polymer of Example 27.

|   | PBT | Filler | Glass Fiber | Core-Shell Polymer | Polyester Elastomer | Izod |
|---|---|---|---|---|---|---|
| A | 70 | 15 | 15 | — | — | 0.95 ± .03 |
| B | 50 | 15 | 15 | 20 | — | 1.50 |
| C | 50 | 15 | 15 | — | 20 | 1.89 ± .08 |
| D | Predicted value for 1:1 ratio of core-shell polymer/polyester elastomers at 20% level | | | | | 1.70 |
| E | 50 | 15 | 15 | 10 | 10 | 1.99 |
| F | 50 | 15 | 15 | 13.3 | 6.7 | 1.71 |

EXAMPLE 46

The procedure of Example 44 is repeated, except eliminating the particulate filler and using the PBT of Example 35.

|   | PBT | Glass Fiber | Core-Shell Polymer | Polyester Elastomer | Izod |
|---|---|---|---|---|---|
| A | 70 | 30 | — | — | 2.30 ± .14 |
| B | 50 | 30 | 20 | — | 4.59 ± .31 |
| C | 50 | 30 | — | 20 | 4.15 ± .24 |
| D | Predicted value for 1:1 ratio of core-shell polymer/polyester elastomer at 20% level | | | | 4.37 |
| E | 50 | 30 | 10 | 10 | 4.71 ± .28 |

EXAMPLE 47

The procedure of Example 46 is repeated except using the core-shell polymer of Example 27.

|   | PBT | Glass Fiber | Core-Shell Polymer | Polyester Elastomer | Izod |
|---|-----|-------------|--------------------|--------------------|------|
| A | 70 | 30 | — | — | 1.76 |
| B | 50 | 30 | 20 | — | 2.47 |
| C | 50 | 30 | — | 20 | 4.17 |
| D | Predicted for 1:1 ratio of core-shell polymer/polyester elastomer at 20% level | | | | 3.32 |
| E | 50 | 30 | 10 | 10 | 3.50 |

EXAMPLE 48

This Examples illustrates the synergistic effects obtained with a variety of commercial polyester elastomers. Hytrel is a trademark of E. I. duPont de Nemours, Inc.

|   | PBT Of Ex. 35 | Filler | Core-Shell Polymer Of Example 22 | Polyester Elastomer | Izod |
|---|------|------|------|------|------|
| A | 70 | 30 | — | — | 0.50 ± .10 |
| B | 50 | 30 | 20 | — | 0.69 ± .05 |
| C | 50 | 30 | — | 20 (Hytrel 4056) | 0.71 ± .03 |
| D | 50 | 30 | — | 20 (Hytrel 5525) | 0.50 ± .15 |
| E | 50 | 30 | — | 20 (Hytrel 5555) | 0.54 ± .12 |
| F | 50 | 30 | — | 20 (Hytrel 6345) | 0.49 ± .12 |
| G | 50 | 30 | — | 20 (Hytrel 7246) | 0.51 ± .08 |
| H | 50 | 30 | — | 20 (Hytrel 4275) | 0.47 ± .01 |
| | Predicted values for 3:1 ratio of core-shell polymer/polyester elastomer at 20% level | | | | |
| I | | | | (Hytrel 4056) | 0.70 |
| J | | | | (Hytrel 5525) | 0.64 |
| K | | | | (Hytrel 5555) | 0.65 |
| L | | | | (Hytrel 6345) | 0.64 |
| M | | | | (Hytrel 7246) | 0.65 |
| N | | | | (Hytrel 4275) | 0.64 |
| O | 50 | 30 | 15 | 5 (Hytrel 4056) | 0.84 ± .11 |
| P | 50 | 30 | 15 | 5 (Hytrel 5525) | 1.01 ± .01 |
| Q | 50 | 30 | 14 | 5 (Hytrel 5555) | 1.05 ± .04 |
| R | 50 | 30 | 15 | 5 (Hytrel 6345) | 0.88 ± .10 |
| S | 50 | 30 | 15 | 5 (Hytrel 7246) | 0.91 ± .17 |
| T | 50 | 30 | 15 | 6 (Hytrel 4275) | 0.96 ± .06 |

EXAMPLE 49*

|   | PBT Of Ex. 35 | Filler | Core-Shell Polymer Of Example 22 | Poly-carbonate | Izod |
|---|------|------|------|------|------|
| A | 70 | 30 | — | — | 0.51 ± .08 |
| B | 50 | 30 | 20 | — | 0.97 ± .06 |
| C | 50 | 30 | — | 20 | 0.50 ± .04 |
| D | Predicted value for 1:1 ratio of core-shell polymer/polycarbonate at 20% level | | | | 0.74 |
| E | 50 | 30 | 10 | 10 | 0.67 ± 0 |

*This Example illustrates the lack of synergism observed when the polyester elastomer is replaced with a polycarbonate impact modifier.

We claim:

1. A synergistic impact modifier system for poly($C_2$ to $C_8$ alkylene terephthalate) comprising
   A. one or more thermoplastic segmented copolyester elastomers, and
   B. one or more multiphase composite interpolymers comprising a final rigid thermoplastic phase polymerized in the presence of a first elastomeric phase polymerized from a monomer system selected from the group consisting of
      i. a monomer system comprising about 75 to 99.8% by weight $C_1$ to $C_8$ alkyl acrylate, 0.1 to 5% by weight crosslinking monomer, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being polyethylenically unsaturated monomer having a plurality of addition polymerizable reactive groups, at least one of which polymerizes at a substantially different rate of polymerization from at least one other of said reactive groups; and
      ii. a monomer system comprising at least 50 percent by weight butadiene and 0 to 50 percent by weight of a different ethylenically unsaturated monomer, the weight ratio of B to A being about 1:2 to 4:1.

2. The synergistic impact modifier system of claim 1 wherein said graftlinking monomer is allyl methacrylate or diallyl maleate.

3. The synergistic impact modifier system of claim 1 wherein the crosslinking monomer is butylene diacrylate.

4. The synergistic impact modifier system of claim 1 wherein the final rigid thermoplastic phase is polymerized from a monomer system comprising about 50 to 100 weight percent of a $C_1$ to $C_4$ alkyl methacrylate.

5. The synergistic impact modifier system of claim 1 wherein the multiphase composite interpolymer includes an intermediate phase polymerized from a monomer system comprising about 75 to 100% by weight styrene.

6. The synergistic impact modifier system of claim 1 wherein the thermoplastic segmented copolyester has an intrinsic viscosity of at least about 1.0.

7. The synergistic impact modifier system of claim 1 wherein the segmented thermoplastic copolyester elastomer is the condensation product of one or more long chain glycols, one or more short chain glycols, and one or more saturated dicarboxylic acids or esters thereof.

8. The synergistic impact modifier system of claim 7 wherein the long chain glycol is selected from the group consisting of poly($C_1$ to $C_6$ alkylene ether glycols) of molecular weight of about 400 to 6000.

9. The synergistic impact modifier system of claim 7 wherein the short chain glycol is selected from the group consisting of $C_2$ to $C_4$ alkylene glycol.

10. The synergistic impact modifier system of claim 7 wherein the dicarboxylic acid or ester derivative thereof is aromatic.

11. The synergistic impact modifier system of claim 7 wherein the dicarboxylic acid or ester derivative thereof is a mixture dimethyl terephthalate and dimethyl isophthalate.

12. An injection moldable composition comprising one or more poly($C_2$ to $C_8$ alkylene terephthalates) and about 1 to 40% by weight of the synergistic impact modifier system of claim 1.

13. The injection moldable composition of claim 12 wherein the poly($C_2$ to $C_8$ alkylene terephthalate) has an intrinsic viscosity of about 0.5 to 2.

14. The injection moldable composition of claim 12 further including about 10 to 50 weight percent inorganic particulate filler, based on total weight of the blend.

15. The injection moldable composition of claim 12 further including about 10 to 50 weight percent fibrous reinforcement based on total weight of the blend.

16. The injection moldable composition of claim 15 wherein the fibrous reinforcement is glass.

17. The injection moldable composition of claim 12 wherein the poly($C_2$ to $C_8$ alkylene terephthalate) is polybutylene terephthalate.

18. A process for improving the impact strength of poly($C_2$ to $C_8$ alkylene terephthalate) injection molding composition comprising blending therewith the synergistic impact modifier of claim 1.

* * * * *